United States Patent
Huides et al.

(10) Patent No.: US 12,244,505 B1
(45) Date of Patent: Mar. 4, 2025

(54) MANAGED ADAPTIVE NETWORK CONNECTIVITY IN A CLOUD PROVIDER NETWORK

(71) Applicant: Amazon Technologies, Inc., Seattle, WA (US)

(72) Inventors: Rodica-Alexandra Huides, San Francisco, CA (US); Maciej Torbus, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 18/449,914

(22) Filed: Aug. 15, 2023

(51) Int. Cl.
*H04L 47/2475* (2022.01)
*H04L 47/12* (2022.01)

(52) U.S. Cl.
CPC .......... *H04L 47/2475* (2013.01); *H04L 47/12* (2013.01)

(58) Field of Classification Search
None
See application file for complete search history.

(56) References Cited

U.S. PATENT DOCUMENTS

| | | | | |
|---|---|---|---|---|
| 10,992,585 | B1 * | 4/2021 | Gilman | H04L 43/062 |
| 2002/0152305 | A1 * | 10/2002 | Jackson | H04L 43/00 |
| | | | | 709/224 |
| 2016/0080230 | A1 * | 3/2016 | Anand | G06F 16/285 |
| | | | | 709/224 |
| 2016/0359705 | A1 * | 12/2016 | Parandehgheibi | G06F 16/248 |
| 2019/0230011 | A1 * | 7/2019 | Gandham | H04L 41/145 |
| 2019/0230112 | A1 * | 7/2019 | Gandham | H04L 63/1425 |
| 2020/0076738 | A1 * | 3/2020 | Rao | H04L 47/74 |
| 2020/0274787 | A1 * | 8/2020 | Dasgupta | H04L 47/32 |
| 2022/0329522 | A1 * | 10/2022 | Maciocco | H04L 41/16 |
| 2023/0010406 | A1 * | 1/2023 | Doshi | H04L 63/0218 |
| 2023/0261930 | A1 * | 8/2023 | Kumar | H04L 41/069 |
| | | | | 709/224 |
| 2024/0259286 | A1 * | 8/2024 | Shah | H04L 43/026 |

FOREIGN PATENT DOCUMENTS

EP 3148118 A1 * 3/2017 ......... H04L 41/0806

* cited by examiner

Primary Examiner — Phyllis A Book
(74) Attorney, Agent, or Firm — Nicholson DeVos Webster & Elliott LLP

(57) ABSTRACT

Techniques for adaptive network connectivity in a cloud provider network are described. A managed networking service obtains metadata associated with an application deployed in the cloud provider network and uses the metadata to construct a graph including application components and network components. Network flows are identified from the metadata and used to construct flow metadata that is linked to paths of the graph. The flow metadata is further enhanced with capability information for the network components on the path. The graph can be efficiently analyzed to identify alternative, superior networking configurations for the application.

20 Claims, 11 Drawing Sheets

MANAGED ADAPTIVE NETWORK CONNECTIVITY IN A CLOUD PROVIDER NETWORK

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing computing resources have become increasingly complicated.

The advent of virtualization technologies has provided benefits with respect to managing large-scale computing resources for many users with diverse needs, allowing various computing resources to be efficiently and securely shared by multiple users. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies can provide virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Modern cloud provider networks have grown very large in terms of size as well as in terms of the numbers of services offered and users involved. In such systems, huge amounts of computing resources are deployed in large numbers of locations that all must cooperatively work to provide a coherent logical view of the provider network's services. Thus, it is imperative that these resources can communicate efficiently and effectively to avoid service disruptions or other negative effects to user resources and workloads.

BRIEF DESCRIPTION OF DRAWINGS

Various examples in accordance with the present disclosure will be described with reference to the drawings, in which.

DETAILED DESCRIPTION

Figure 1:
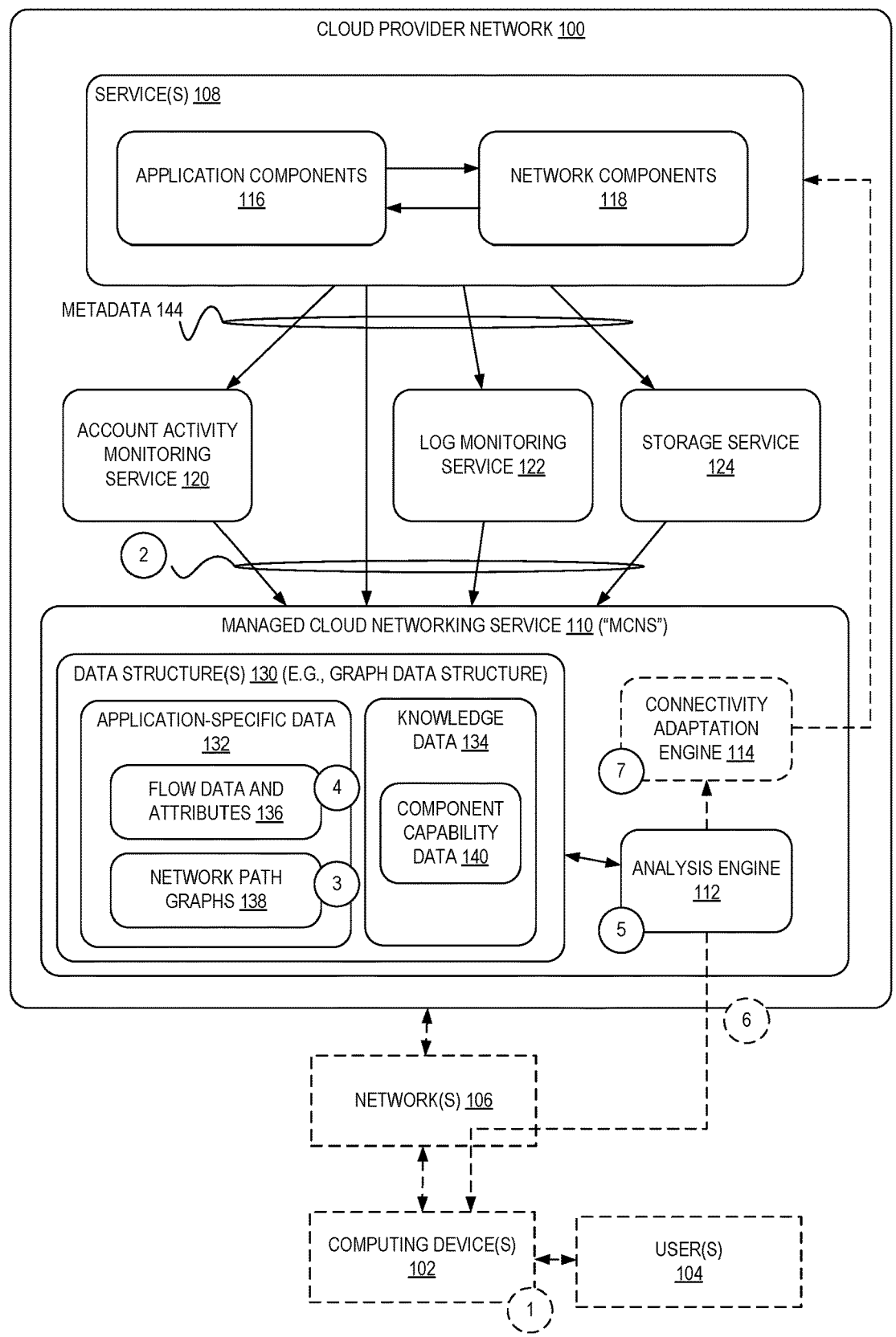
FIG. 1 is a diagram illustrating an environment providing managed adaptive network connectivity in a cloud provider network according to some examples.

The present disclosure relates to methods, apparatus, systems, and non-transitory computer-readable storage media for adaptive network connectivity in a cloud provider network. According to some examples, a managed cloud networking service (or "MCNS") analyzes flows of network traffic of an application deployed within the cloud network, with an understanding of the capabilities of the network components involved, to determine if and when it would be beneficial to modify the network configuration of the application. In some examples, the MCNS can make use of more than typical network information (e.g., measured latency or packet loss) to optimize network paths, for example, by considering factors such as the capabilities of the involved network components, capabilities of unused but available network components, the historic, current, and/or predicted future characteristics of the involved traffic flows, and the like, to intelligently modify, or suggest modifications to, an application's network configuration. In some examples, the MCNS treats network flows as part of a graph data structure which maps to the totality of network flows, learns their behavior, and enriches that with the network components of the path and their capabilities and limits. The MCNS can then optimize the paths for the flows, such as by making use of alternative (e.g., optimal) network components, via taking into account their capabilities such as capacity, introduced latency, type of protocols they support, etc.

Managed adaptive network connectivity, or "ANC," involves the intelligent management of network connectivity in real-time based on network conditions, application requirements, and user preferences. ANC aims to provide users with a frictionless network experience by dynamically adapting network configurations to changing network conditions, user demands, and application needs. ANC can use machine learning, statistical analysis, and/or user profiling to analyze network conditions and predict network behavior to meet the application communication flow requirements for performance (e.g., throughput, latency), security (e.g., inspection, filtering) and/or observability (e.g., flow visibility, log collection, monitoring). The MCNS, in some examples, is a managed networking service that makes it easy for users such as developers, network administrators, and DevOps teams to establish secure and reliable connectivity between their applications (or components thereof), whether within a cloud provider network entirely or potentially in other locations or in combinations of cloud and non-cloud locations (e.g., a "hybrid" network). The MCNS can dynamically adjust the network connectivity between applications, depending on the application profile, observed trends, and/or application location. In some examples, the MCNS offsets complexity from users needing to manage "the right tool for the job" in that it can, if desired by the user, automatically reconfigure the available network component primitives (e.g., virtual network components available for providing inter-component connectivity) for the application. In some examples, using predictive analytics, the MCNS anticipates future network demands and proactively changes the network connectivity infrastructure to meet these expected demands.

Examples disclosed herein can thus provide benefits to users within existing applications deployed (at least partially) within a cloud provider network, or for users seeking to migrate their applications into a cloud provider network, potentially across multiple cloud virtual networks, availability zones, regions, accounts, and/or other networks (e.g., other cloud networks, on-premise networks, etc.). In the latter case, IT infrastructure managers seeking to perform such migrations typically do not have sufficient visibility or time to determine network connectivity patterns across all their application components and data sets—the MCNS can provide a simple way of establishing network connectivity that dynamically aligns with the demand for network resources by automatically optimizing a networking configuration based on traffic. For example, some applications have network traffic that can spike (e.g., 100×) in a matter of minutes. Previously, administrators would need to spend huge amounts of time trying to analyze network connectivity patterns in the application infrastructure to decide what network connectivity service(s) to use to accommodate the various use cases involved, while still not having full confidence that certain edge cases wouldn't be accounted for, leading to application disruptions with potential losses of connectivity.

Accordingly, examples disclosed herein provide technological solutions providing tangible technological benefits, such as increased application and system uptime (e.g., due to eliminating or quickly responding to overloaded networking components) and also performance (e.g., improved application execution time, perceived performance via improved time-to-respond, etc.) that can be substantially improved through traffic-sensitive dynamic zero-downtime networking reconfiguration techniques disclosed herein.

FIG. 1 is a diagram illustrating an environment providing managed adaptive network connectivity in a cloud provider network according to some examples. In FIG. 1, a managed cloud networking service 110 (or MCNS 110) is illustrated as being part of a cloud provider network 100. The MCNS 110 can be implemented using hardware, software, or a combination of both. In some examples, the MCNS 110 is implemented as software executed by one or more computing devices in one or more locations, e.g., within one or more availability zones (AZs) of the cloud provider network 100.

A cloud provider network 100 (or, provider network, service provider network, or the like) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services (e.g., services 108), such as a hardware virtualization service that can execute compute instances, a storage service (e.g., storage service 124) that can store data objects, etc.

The users (or "customers") of cloud provider networks 100, such as user 104, can use one or more user accounts that are associated with a customer account, though these terms can be used somewhat interchangeably depending upon the context of use. Users can interact with a provider network 100 through use of a computing device 102 (e.g., a personal computer, laptop, mobile device, server device, smart device, or the like) across one or more intermediate networks 106 (e.g., the internet) via one or more interface(s) of the cloud provider network 100, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, the term cloud provider network, or just "cloud," may be used to refer to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual routers, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host computing device can have an IP address in the substrate network. Hardware virtualization technology can enable multiple operating systems to run concurrently on a host computing device, for example as VMs on the host. A hypervisor, or virtual machine monitor (VMM), on a host may allocate the host's hardware resources amongst various VMs on the host and monitor the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

The MCNS 110 is implemented within cloud provider network 100 and may be within one or more regions of the cloud provider network 100. The MCNS 110, as described herein, serves to manage the networking configuration of one or more applications deployed entirely or in part within the cloud provider network 100. For example, a set of application components 116—e.g., virtual machines, containers, block storage volumes, database instances, object storage locations, on-demand serverless functions, and the like—may be hosted or managed by one or more services 108 of the cloud provider network 100, such as a hardware virtualization service, container service, object storage service, database service, on-demand code execution service, or the like. Though these application components 116 are shown as all being hosted in the cloud provider network 100, it is to be understood that other application components may be located outside of the cloud provider network 100, such as in a third-party network, public or private cloud or data center, customer on-premises ("on-prem") network, or the like.

The application infrastructure (or configuration) also includes a set of one or more network components 118 (or network connectivity components, networking components) utilized to provide communication connectivity between ones of the application components 116. These network components 118 are typically "virtual" network components, in that they can be implemented as software modules (or even software/network configurations) that can be added, removed, and/or reconfigured within the cloud provider network 100, typically for the sole use of the user/application.

Notably, as used herein, the term network components 118 is to be broadly interpreted to cover various types of communication functionalities, such as cloud-implemented virtualized network functions (e.g., cloud routers, firewalls, etc.), as well as connectivity components that may not have a physical counterpart but instead provide connectivity between other components, such as a type of "link" or "module" that allows one computing resource to communicate with another type of resource. For example, many different types of network components 118 (or "primitives") may be offered for use (and thus, implemented) by the cloud provider network 100 that each cover a specific area of network connectivity in the cloud. As one example, a cloud router (e.g., AWS Transit Gateway) may connect cloud virtual networks ("CVNs", also referred to as virtual private clouds) and/or on-premises networks through a central hub acting as a highly scalable cloud router, where each new connection may be made only once. Such cloud routers may also allow for CVN-to-CVN connectivity at scale in a region. Similarly, a cloud provider network 100 may provide network peering components (e.g., AWS VPC Peering) providing networking connections between two CVNs that can route traffic between the CVNs efficiently and privately. Moreover, a "privatelink" endpoint (e.g., AWS PrivateLink) can be offered that provides private connectivity between CVNs, other supported cloud provider network services, and on-premises networks without exposing traffic to the public internet. Additionally, a "resource link" endpoint component (e.g., AWS ResourceLink) allows private and secure connectivity from a customer's CVN and on-premise network to some individual computing resource (e.g., a compute instance, a database instance, a big data cluster, etc.) in another CVN. Another type of network component type that could be offered may include a "CVN lattice" (e.g., Amazon VPC Lattice) that is an application layer networking service providing a consistent way to connect, secure, and monitor service-to-service communications. Other types of network components can also be used in various implementations, such as load balancers, gateways, routers, switches, tunneling components, and the like. Thus, the term "network component" is to be generally understood as broadly encompassing various interconnectivity offerings, which may be offered within a cloud provider network.

Notably, these different network component offerings fundamentally offer different capabilities that are more or less beneficial in different usage scenarios. For example, it could be the case that a first type of networking component may provide the best connectivity between a first CVN and a second CVN when there are more than a threshold number of resources using the component (e.g., more than one hundred compute instances), whereas a second type of networking component may provide better performance when there are fewer than the threshold number of resources using the component (e.g., less than one hundred compute instances). Moreover, some types of network components may provide better or worse performance based on other factors, such as what amount of latency it introduces for communications, what throughput it can provide, what transport capabilities it provides (e.g., encryption), what types of protocols it supports, how many concurrent connections it can support, and the like.

Thus, it may be the case that a first type of networking component is superior (compared to all other options) for providing connectivity between a particular set of application components. However, it may also be the case that the first type of networking component is superior during certain periods of time (e.g., during business hours, during workdays, etc., when low introduced latency and/or large numbers of connections may be needed) but a second type of networking component would perform superior during other periods of time (e.g., during an overnight database backup, when comparatively high amounts of throughput may be required).

As described herein, the MCNS 110 can manage these network components 118 and determine if and when a change may be beneficial for the application, and if authorized by the associated user(s), may automatically make these changes (or make changes upon explicit user confirmation of proposed changes), improving performance and preventing performance degradation or downtime.

Thus, in some examples as reflected by illustrated circle (1), a user 104 (via use of a computing device 102) may request the MCNS 110 to monitor an application on their behalf to identify (and optionally, implement) potential changes to the application infrastructure (e.g., the particular network components 118) that may improve the performance of the application. This may be performed by the user 104 using a graphical user interface (GUI), such as one provided by a portal or dashboard type application associated with (and/or provided by) the cloud provider network 100 or MCNS 110. For example, the user may click or select a user interface input element (e.g., a checkbox, radio button, button, the like) indicating that MCNS 110 is to monitor the application. As another example, the user may click or select a user interface input element (e.g., a checkbox, radio button, button, the like) indicating that MCNS 110 is to monitor the application and make recommendations to the user for changes to be made or indicating that MCNS 110 is to monitor the application and automatically make changes when it detects a change that would be beneficial. However, other types of configurations may be used, and thus the request may indicate that one or more of monitoring is to occur, suggestions are to be made, and/or suggested changes are to be automatically implemented.

Thereafter, at circle (2) the MCNS 110 is able to monitor the application. In some examples, the MCNS 110 obtains metadata 144 associated with the application (e.g., application components 116 and/or network components 118) from one or multiple sources. In some examples, the MCNS 110 can obtain information directly from services 108 that may be hosting or implementing ones of the application components 116 and/or network components 118, such as by the MCNS 110 sending "describe" type API calls to various services, seeking metadata 144 in response that identifies which application components 116 exist (e.g., for a particular account or collection of accounts), which network components 118 exist, and the like. In some examples, this may further include the MCNS 110 sending additional calls to these services when resources are found to exist, which may include obtaining additional information about these resources (e.g., specific configuration aspects, sizes, numbers, etc.). This metadata 144 may describe the existence of particular resources, the configuration of particular resources, the utilization levels of particular resources, or the like.

Alternatively, or additionally, the MC NS 110 may indirectly obtain metadata 144 via other systems, such as account activity monitoring service 120, log monitoring service 122, storage service 124, etc.

For example, an account activity monitoring service 120 (e.g., AWS CloudTrail) may monitor and record account activity across a user's cloud infrastructure, e.g., via ingesting activity events from within and/or outside of the cloud provider network. These events may include management events that capture control plane actions on resources, such as creating or deleting storage locations (e.g., "buckets" or "folders" of a storage service), and/or data events that capture data plane actions within a resource, such as reading or writing an object stored in a storage service. The account activity monitoring service 120 may also ingest data through its native integration with other services 108, such as configuration items that capture resource configuration history and resource compliance history as evaluated by cloud provider network configuration rules, and/or audit evidence from an audit manager service that contains the information needed to demonstrate compliance with the requirements as specified by controls. In some examples, the account activity monitoring service 120 may provide as metadata 144 a history of events (e.g., "control plane" events identifying configuration/control occurrences) that it has observed pertaining to application components 116 and/or network components 118.

A log monitoring service 122 may monitor cloud provider network resources and the applications run therein, e.g., by collecting and tracking metrics (e.g., a CPU load of a VM, an amount of requests processed over a unit time, etc.), which are variables that can be measured for your resources and applications, and/or logs (e.g., network flow logs) generated by cloud provider network resources and the applications. Thus, this information may be obtained by the MCNS 110 from the log monitoring service 122 as metadata 144.

Additionally, or alternatively, the MCNS 110 may obtain metadata 144 from a storage service 124 (e.g., an object storage service, a database service, a data lake service, etc.) that may have been stored there by ones of the application components 116, network components 118, and/or services 108 themselves. For example, an application component 116 or network component 118 may write its own logging information (pertaining to its performance and/or configuration) to a text file or database, which can be accessed by the MCNS 110 (e.g., via the MCNS 110 sending requests to read particular data from the storage service 124).

Thereafter, based on this metadata 144, the MCNS 110 can construct a graph data structure representing the application in terms of its application components 116 and network components 118 at circle (3), which can be stored within application-specific data 132 data structures 130 as network path graphs 138 (also referred to herein as just a graph, or a graph data structure). In some examples, the MCNS 110 can identify all application components and create nodes for these components in the graph and identify all network components in use and also create nodes for these components in the graph. The MCNS 110 can also identify which edges are to exist between these nodes based on observed network traffic (e.g., network flows), thus creating edges between application components 116 and/or network components 118 when network flows are determined to exist, based on the metadata 144, between a particular pair.

The MCNS 110 can also create network flow metadata for each flow and associate the flow metadata with various paths of the graph. As used herein, a "network flow" is to be broadly understood as a collection of network traffic (e.g., a sequence of packets) carrying information between two "hosts" that shares a particular set of properties. As one example, a network flow may be represented by a 5-tuple made up of a source Internet Protocol (IP) address of the sender, a source port used for the traffic, a destination IP address of the recipient, a destination port, and an identifier of a protocol (e.g., TCP or UDP). Thus, a "flow" can identify a particular communication channel, where all packets sharing a same 5-tuple will belong to a same flow.

This network flow metadata can be stored as flow data and attributes 136, as shown via circle (4). For example, the network flow metadata can include "traditional" (e.g., 5-tuple) network flow metadata such as a source of the traffic (e.g., an IP address), a destination of the traffic (e.g., an IP address), a source port, a destination port, a protocol identifier, or the like. However, in some examples the MCNS 110 further enriches the flow metadata, such as including identifiers of the path components or "hops" (e.g., identifiers of the network components 118 in the flow), flow attributes such as historic, current, and/or predicted performance values (e.g., latency, throughput, etc.) or directionality of the flow, a corresponding path identifier (from the graph) that corresponds to the flow path, a set of flow dependencies if they exist (e.g., identifying if the flow is correlated with another flow in some manner, whether it is consecutive in time, concurrent, etc.).

The MCNS 110 also, in some examples, includes additional network flow metadata such as characteristics or capabilities of the network components in the flow, such as an identifier of a maximum throughput of the network component, an indication of a number of requests per unit time the network component can handle, an amount of latency added by the network component, etc. However, in some cases, this capability information may be referenced for the associated network components by instead looking it up in a separate data structure, e.g., component capability data 140 within a knowledge data 134 set of data structures 130. As this information may be more general in nature and not application specific, it may thus be obtained (e.g., from the associated service(s) that provide the network component) and maintained separately in a more central manner.

The MCNS 110 may continue to monitor the application in this manner by obtaining additional metadata 144 over time, e.g., according to a schedule, on an event-driven basis, or the like. The MCNS 110 may thus update the network path graphs 138, such as when additional application components, network components, and/or interconnections therebetween are discovered. The MCNS 110 may also update the flow data and attributes 136, e.g., upon observing different utilization metrics, different flows beginning, or the like.

The monitoring may also include updating flow data and attributes 136, e.g., to update a set of historical metrics associated with network flows, to update a set of predicted metrics associated with network flows, or the like. For example, the MCNS 110 may utilize a predictive machine learning model (e.g., a predictive model that operates on time-series data) to generate a "forecast" of predicted traffic (e.g., in terms of requests, network size, or the like) for a particular flow for a particular period (or set of periods of time), such as an expected amount of traffic for the next hour (or on an hour-by-hour basis), for the next day, or the like.

An analysis engine 112, as shown at circle (5) may analyze the flow data and attributes 136 and network path graphs 138 to determine whether a modification to the application configuration—especially pertaining to the set of utilized network components 118—could be made that would be beneficial. This analysis may occur on a schedule (e.g., every minute, thirty minutes, hour, day, etc.), upon a request to do an analysis (e.g., such as a command to perform an analysis issued on behalf of the user 104), upon an event occurring (e.g., a change occurring to the application, such as a new application component 116 being added, an "alarm" being generated by another system and detected identifying an operational issue associated with the application, etc.), or the like.

In some examples, this analysis includes using the graph 138 and flow data 136 to determine if any network components 118 may currently (or soon, based on historic and/or predicted metadata) be reach a "high" usage, such as an amount of traffic (in number of requests, size, or the like) passing some threshold amount—e.g., currently or predictively exceeding a defined maximum number of requests that the network component is known (e.g., per component capability data 140 and/or flow data 136) to be able to handle, or currently or predictively exceeding some component-specific threshold (e.g., exceeding 90% of network component request or throughput capacity, exceeding some threshold of introduced latency created by the network component). This can include using the graph to identify, for a network component node in the graph, all flows that involve the network component, and analyzing a current and/or predicted amount of traffic (or load) that those flows are placing or will place on the network component.

If and when such a condition is found where the set of flows (or a subset thereof) satisfies such a configured condition associated with the network component, the analysis may include identifying another configuration that can "fix" the issue and eliminate the condition. For example, the analysis engine 112 may be able to identify the involved network flows, the type of traffic for those flows, the predicted length of time those flows will be active, and the like, and use this to determine that a different type of network component may be better suited to serve some or all of those network flows. For example, if a few network flows are found to be disproportionately impacting the performance of the network component (such as due to a scheduled database backup that involves transmitting a lot of data), the analysis engine 112 may determine that just these flows could be better served by a different type of network component that provides comparatively higher throughput. As another example, the analysis engine 112 could determine to instead use multiple other types of network components 118 for various ones of the involved flows, change the configuration of a network component 118 to better process the collection of flows, or the like.

Upon determining a recommended change, based on the configured preferences of the user 104, the analysis engine 112 may at optional circle (6) provide an indication of the recommended change for the user 104, such as by transmitting data for a GUI (e.g., data for a website) that describes the recommended change, details the detected issue, or the like. In some examples, the user 104 may be able to instruct the MCNS 110 to implement the recommended change, e.g., via the computing device 102 sending a request to the MCNS 110. Alternatively, in some examples the MCNS 110 may instead automatically begin implementing the recommended change, which may occur based on the user 104 having given earlier consent (e.g., via an "opt-in" procedure) to allow the MCNS 110 to perform such actions on their behalf.

Thus, whether under the direction of the user or on an automated fashion, at circle (7) the analysis engine 112 may provide a description of the recommended change to a connectivity adaptation engine 114, which can implement the change(s). For example, the connectivity adaptation engine 114 can send commands to the appropriate services 108 to cause the change to be implemented. For example, the connectivity adaptation engine 114 may send a command to deploy or use a new type of network component (to a first service of services 108) and may send one or more commands (potentially to other services 108) to cause one or more network flows to change their path, e.g., via updating an application component 116 to inform it of a new destination/sink for its traffic, to update routing rules, to update firewall rules, to update DNS resolution processes (e.g., to map a hostname to a new address), etc. In some examples, such as when an existing network component will no longer be utilized, the connectivity adaptation engine 114 may also send one or more commands to terminate or retire that existing network component (upon verifying that it is no longer actively serving traffic).

Figure 2:
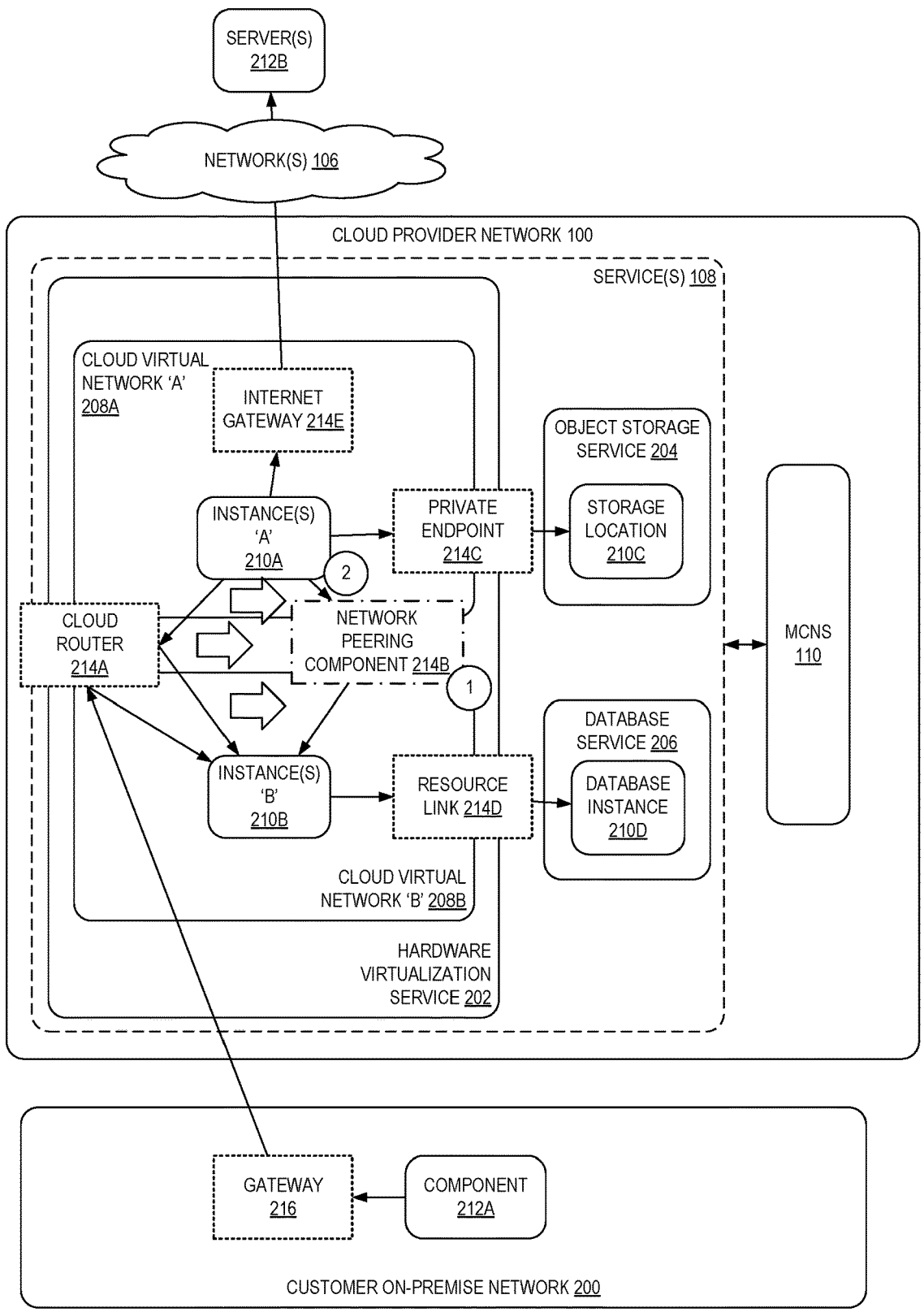
FIG. 2 is a diagram illustrating adaptive network connectivity operations for an application including application components and network components in a cloud provider network according to some examples.

A more specific example is presented with regard to FIG. 2, which is a diagram illustrating adaptive network connectivity operations for an application including application components and network components in a cloud provider network according to some examples.

As shown, the MCNS 110 monitors an application that includes a component 212A (utilizing a gateway 216) in a customer on-premise network 200 along with other application components in the form of one or more instances 'A' 210A hosted by a hardware virtualization service 202 within a first cloud virtual network 'A' 208A, along with another one or more instances 'B' 210B also hosted by a hardware virtualization service 202 but within a second cloud virtual network 'B' 208B. The application components also include a database instance 210D hosted by a database service 206, a storage location 210C (e.g., a folder or bucket) provided by an object storage service 204. The application components also include some set of server(s) 212B at some other location, accessed via one or more other networks 106 (e.g., the internet).

As described herein, cloud provider networks may provide "managed compute services" that execute code or provide computing resources for its users in a managed configuration. Examples of managed compute services include, for example, an on-demand code execution service, a hardware virtualization service, a container service, or the like. Such services may provide or "host" application components for applications.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code.

A hardware virtualization service (referred to in various implementations as an elastic compute service, a virtual machines service, a computing cloud service, a compute engine, or a cloud compute service) can enable users of the provider network 100 to provision and manage compute resources such as VM instances. VM technology can use one physical server to run the equivalent of many servers (each of which is called a VM), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). VMs are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Users may also use cloud virtual networks (or "CVNs," which also may be referred to as a virtual private cloud (VPC), virtual network (VNet), virtual private network, or virtual cloud network, in various implementations) which are custom-defined, virtual networks existing within another network, such as a cloud provider network. A CVN can be defined by at least its address space, internal structure (e.g., the computing resources that comprise the CVN, virtual firewall rules, etc.), and transit paths, and is logically isolated from other virtual networks in the cloud. A CVN can span all of the availability zones in a particular region.

A CVN can provide the foundational network layer for a cloud service, for example a compute cloud or an edge cloud, or for a customer application or workload that runs on the cloud. A CVN can be dedicated to a particular customer account (or set of related customer accounts, such as different customer accounts belonging to the same business organization). Customers can launch resources, such as compute instances, into their CVN(s). When creating a CVN, a customer can specify a range of IP addresses for the CVN in the form of a Classless Inter-Domain Routing (CIDR) block. After creating a CVN, a customer can add one or more subnets in each availability zone or edge location associated with its region.

To enable communications between application components, the application includes the use of various networking "primitives" offered by the cloud provider network 100. In this case, a cloud router 214A networking component is used to allow instances from the two cloud virtual networks 208A-208B communicate with one another, along with the on-premise component 212A (via gateway 216) to communicate with one of the instance(s) 'B' 210B. Additionally, an "internet gateway" 214E networking component within CVN 'A' 208A allows ones of the instances 210A therein to communicate with the server(s) 212B, while a private endpoint 214C networking component allows those instances 210A to communicate with the storage location 210C, and further a resource link 214D networking component allows instances 210B in CVN 'B' 208B to communicate with a database instance 210D. In some cases, a remote gateway 216 may also be considered and modeled (for inclusion within the graph), though it may be labeled as unable to be directly modified (and thus a user must be prompted for any proposed change), or it may be at least partially under the control of the cloud provider network 100 and thus be just as modifiable as any other networking component.

As shown, it could be the case that the MCNS 110, after identifying the network flows (wherein the directionality is represented herein with arrows) may determine that a condition is satisfied wherein the amount of traffic from one or more flows involving (or transiting) the cloud router 214A is (or will likely) cause a performance impact. For example, an amount of traffic may be more than the cloud router 214A can handle. Potentially, this could result from multiple flows all contributing heavily and thus some or all flows should be moved to utilize other types of networking components, though it could also be the case that a single flow (or a small set of flows) is disproportionately sending large amounts of traffic and maybe just that flow (or all flows) would benefit from being shifted elsewhere. For example, it could be the case that a particular source of traffic (e.g., instance(s) 'A' 210A) may suddenly need to send traffic at a sustained throughput of one hundred gigabits per second for a few hours, such as during a backup or replication process, while the network component it is using has a limit of approximately the same (or slightly more or less) throughput that it can provide. Alternatively, it could be the case that a single flow is experiencing a network component related issue, such as an unacceptable amount of introduced latency from the cloud router 214A, and thus perhaps only one flow needs modification.

Thus, the MCNS 110 can identify one or multiple flows that could potentially benefit from being moved (or from having other flows moved). The MCNS 110 can then determine what potential changes could be made to improve the situation, such as shifting one or more flows to instead use a different type of networking component. For example, if a large increase of traffic (in terms of throughput) is occurring (or will occur) that will cause problems, the MCNS 110 could determine whether another type of networking component might exist that has better throughput capabilities and that can work for that particular flow (e.g., can support the type of protocol involved, needed monitoring or logging, etc.).

As shown in FIG. 2, in this example the MCNS 110 determines that one or more of the network flows (of traffic) originating from instances 'A' 210A, via cloud router 214A, and destined to instances 'B' 210B could and should be moved to a new type of networking component—here, a networking peering component 214B (that might not exist). Thus, at circle (1) the MCNS 110 can cause such a networking peering component 214B to be launched or configured such as by sending commands to a service (providing such a component) to launch it. At circle (2), the MCNS 110 may perform other actions to finalize the move, such as reconfiguring other routing rules (e.g., substrate routing rules), firewalls, DNS resolution processes, etc., to cause the traffic associated with those network flows to instead flow through the network peering component 214B. In some cases, the MCNS 110 may also terminate the cloud router 214A, though here it may be the case that the MCNS 110 can determine that other flows still use it, and thus it can be kept.

Figure 3:
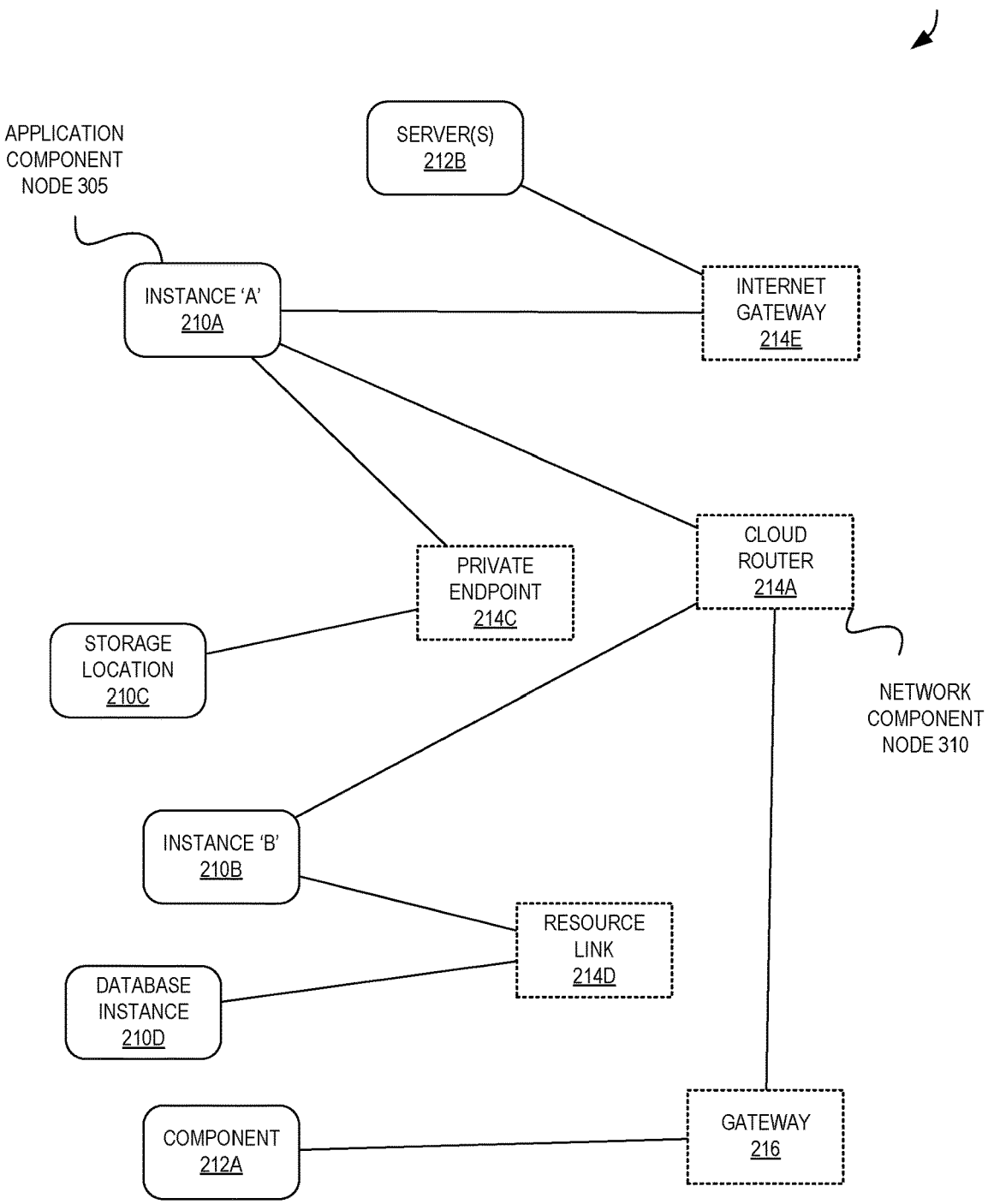
FIG. 3 is a diagram illustrating a generated application graph with nodes corresponding to application components and network components according to some examples.

As indicated herein, the MCNS 110 can perform this analysis via use of a graph corresponding to the application's infrastructure, which can be further modified or enhanced as described herein, for rapid and precise analysis. FIG. 3 is a diagram illustrating a generated application graph 300 with nodes corresponding to application components and network components according to some examples. This figure shows one example graph that can be constructed based on the (initial) state of the application in FIG. 2. In this figure, the detected application components are included as rounded nodes with solid borders, such as application component node 305 for instance 'A' 210A, while the detected network components are included as square nodes with dashed borders, such as network component node 310 for cloud router 214A. The lines, or edges, coupling ones of the components are generated when an observed network flow exists between those two components.

Figure 4:
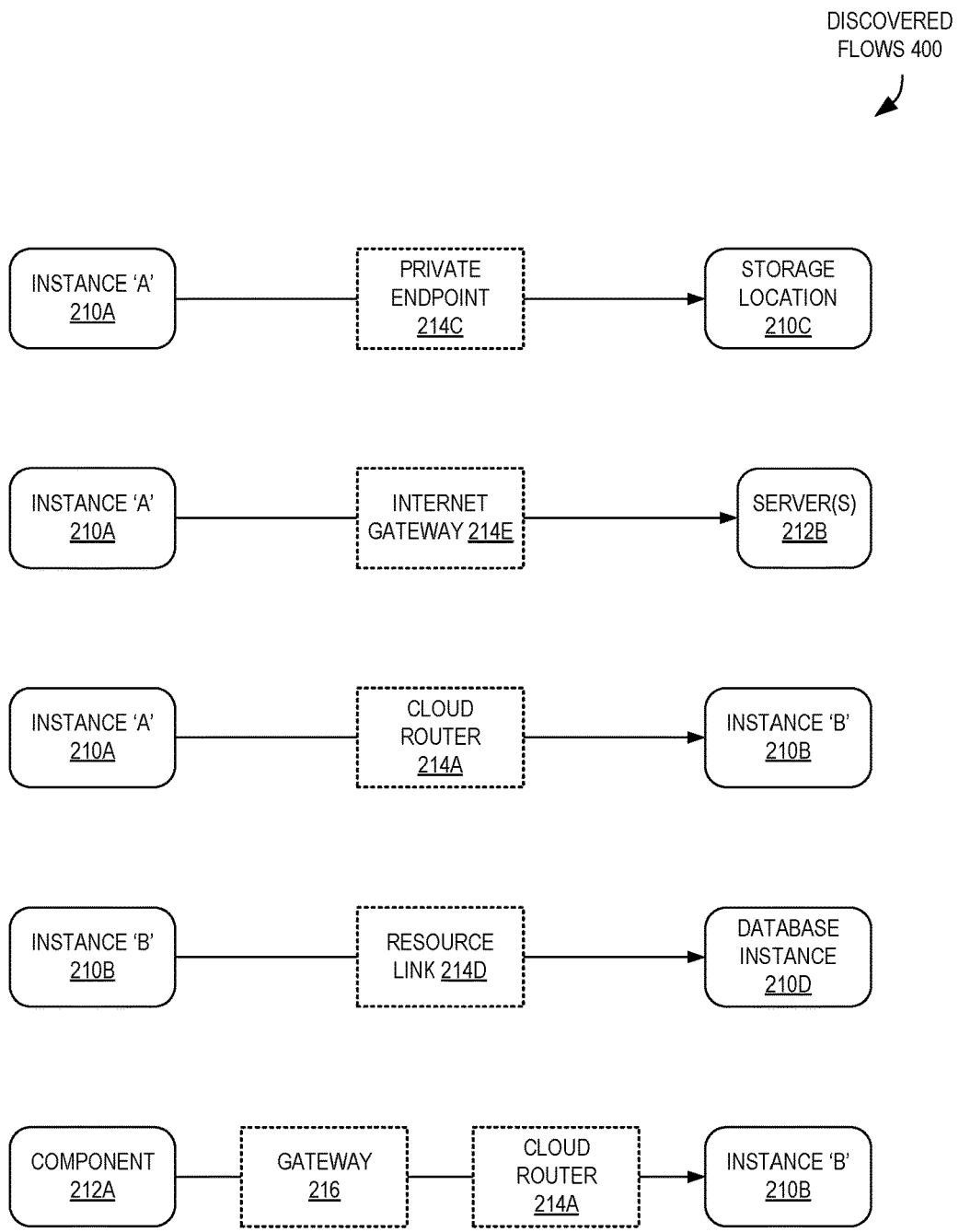
FIG. 4 is a diagram illustrating discovered flows of an application including both application components and network components according to some examples.

This graph can be further enhanced based on detected flows. FIG. 4 is a diagram illustrating exemplary discovered flows 400 of an application including both application components and network components according to some examples. This figure shows one example set of flows that can be detected based on the (initial) state of the application in FIG. 2. Here, a first flow is observed that originates with instance 'A' 210A, passes through a network component of private endpoint 214C, and ends with storage location 210C. Other flows are also detected, and the last shown flow transits two different network components—starting at component 212A, the traffic flows through gateway 216, and then cloud router 214A, and ends at destination instance 'B' 210B.

Figure 5:
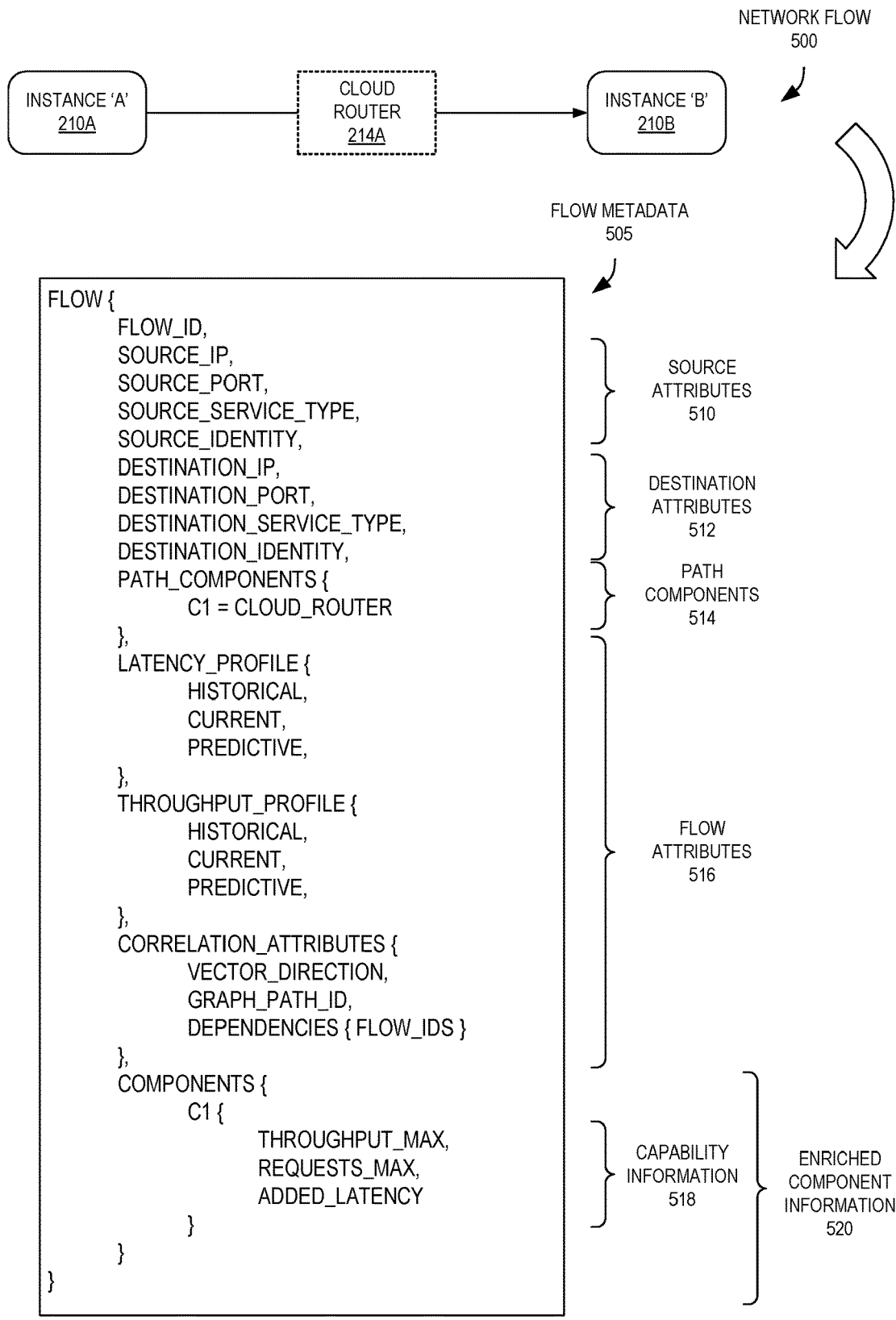
FIG. 5 is a diagram illustrating enhanced flow metadata for a discovered flow that can be associated with a path of a generated application graph according to some examples.

Using these discovered flows, the graph can be modified, or enhanced, with additional information allowing for efficient analysis. For example, FIG. 5 is a diagram illustrating enhanced flow metadata for a discovered flow (e.g., from FIG. 4) that can be associated with a path of a generated application graph according to some examples. For this example flow 500, which involves instance 'A' 210A sending traffic via cloud router 214A to a destination of instance 'B' 210B, the MCNS 110 can generate flow metadata 505 that can be associated (or linked) to a particular path within the graph.

This flow metadata 505 can include a variety of types of information. For example, the flow metadata 505 may include values for a flow identifier, and 5-tuple type flow information in the form of source attributes 510 and destination attributes 512, including but not limited to a source identifier (e.g., a source IP address that originates the traffic), a source port used for originating the traffic, a service type (identifying a type or protocol of the traffic, such as the layer 4 protocol), a destination identifier (e.g., a destination IP address that is the ultimate recipient of the traffic), a destination port where the traffic is sent to. In this example, both a source service type and destination service type are recorded, as are identity information for both the source and the destination (e.g., an identifier of the type of computing resource that it is, such as an identifier of "compute instance" or "storage bucket", or simply a hostname or other unique identifier thereof).

The MCNS 110 can also include, within this flow metadata 505, identifiers of path components 514—here, shown as a single component C1 that is of a type (or identifier) "CLOUD_ROUTER."

The flow metadata 505 can also include flow attributes 516 that allow for sophisticated traffic impact analysis—here, traffic characteristics such as a latency profile, a throughput profile, and a set of correlation attributes. The latency profile may include a summary of historical, observed latency values, a summary of current latency values, and/or a summary of predicted/predictive latency values. Each type of values—whether historic, current, or future—can be generated by the MCNS 110 based on the metadata it obtains over time. For example, to generate historic latency values, the MCNS 110 may maintain statistical data over time recording data such as a minimal observed latency value, a maximum observed latency value, an average or median observed latency value, P10/P50/P90 latency values, or the like. Similarly, current latency values can be those most recently observed (or a statistical consolidation of "recent" latency values), whereas the predictive values can be generated based on modeling, such as via use of a time-series forecasting model (potentially offered by another service—a machine learning service—of the cloud provider network) and indicate what the upcoming latencies may look like. Notably, this data may include or account for "seasonality" type changes in the latency, perhaps on an hourly, daily, weekly, monthly, calendar, or other basis—this, a typical spike in traffic may occur during a busy sales season (where the application is an ecommerce application), or may occur once a week or month during a particular type of backup operation, or the like, and this can be accounted for and accommodated. Similar values can also be provided for throughput, or potentially other characteristics of interest.

The set of correlation attributes can also provide helpful information for analysis, such as a vector direction (indicating a direction of the flow), a graph path identifier (that links the flow metadata to a particular path in the graph), and/or a set of flow dependencies (including flow identifier values for other flows observed to be concurrent, preceding, or subsequent in time to this flow).

The MCNS 110 can also generate enriched component information 520, such as capability information 518, directly within this flow metadata 505. Based on a knowledge base (or direct querying of the underlying service or the component itself), the MCNS 110 can identify capacity information 518 such as a maximum throughput the network component can support, a number of requests (per some unit time, such as second or minute) that the network component can support, an amount of added latency that the network component adds into the communication, or the like. This information can be used by the MCNS 110 to quickly determine if the involved component is being overloaded, how much superior or inferior it is to other types of network components that could instead be used, how many (and which) network flows need to be moved away from the network component, and the like.

Figure 6:
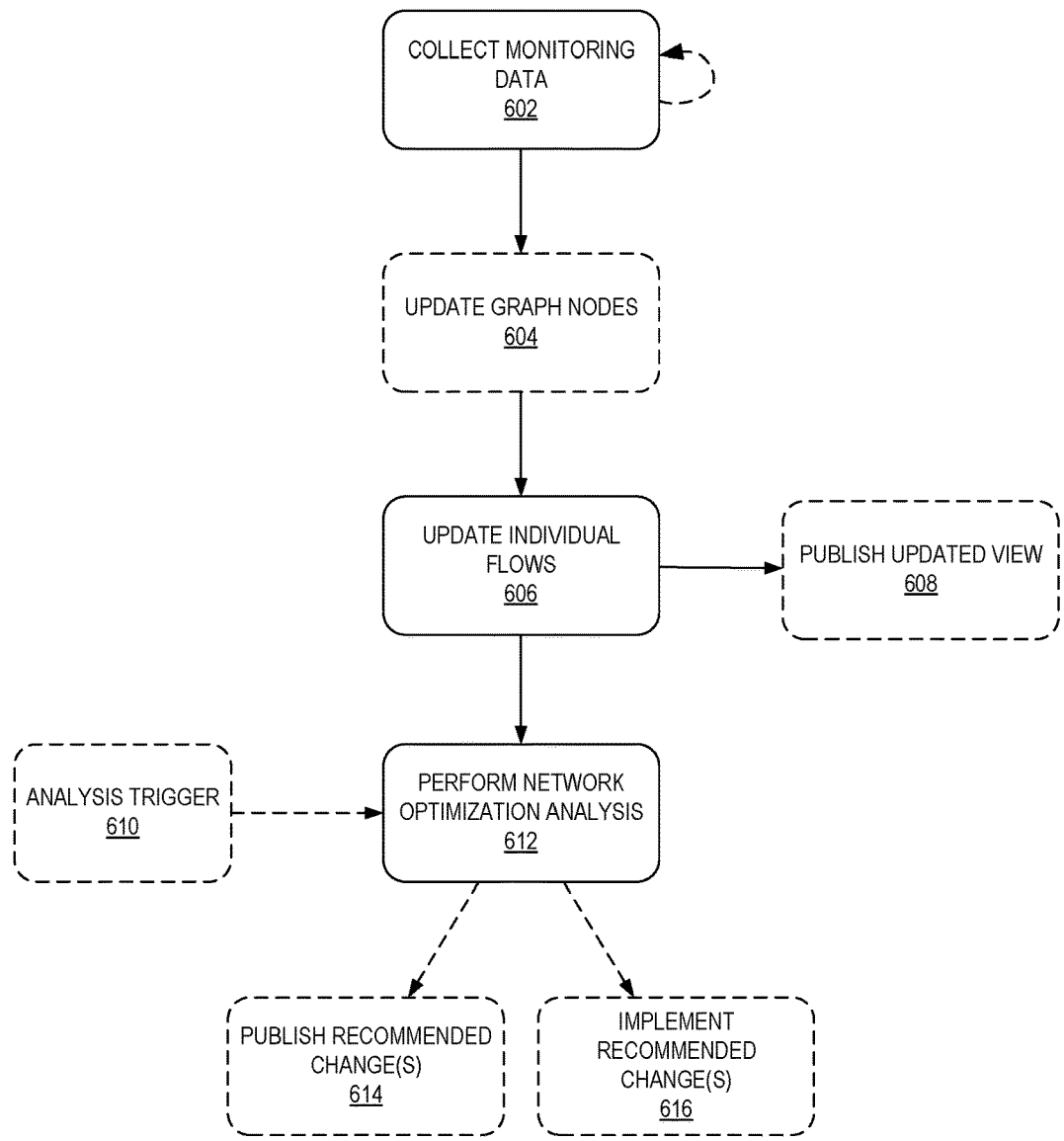
FIG. 6 is a flow diagram illustrating operations of a method for providing managed adaptive network connectivity in a cloud provider network according to some examples.

FIG. 6 is a flow diagram illustrating operations 600 of a method for providing managed adaptive network connectivity in a cloud provider network according to some examples. Some or all of the operations 600 are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the MCNS 110 of the other figures.

In some examples, a user space is defined for an application, which may include all resources associated with one or more user accounts, which may be associated with one or more CVNs.

At block 602, the operations 600 include collecting monitoring data from within the user space that identifies application components, network components, and access patterns. This may include obtaining access logs associated with API calls, flow logs associated with the CVNs, access logs from underlying services (hosting the components), etc.

At block 604, the operations 600 include creating or updating a graph data structure for the application. The graph may include nodes for application components and network components, and may potentially be multi-level (e.g., include sub-nodes within nodes, representing accounts, CVNs, resources, services, etc.). Paths in the graph may represent dependencies, and directional vectors represent communication needs.

At block 606, the operations 600 include updating metadata associated with individual flows based on the collected monitoring data. In some examples, once the monitoring data is ingested and access patterns are learned (e.g., the graph nodes, sub-nodes, vectorized paths, etc.), metadata is associated (or updated) with each traffic flow. The metadata can include traffic flow source attributes, such as IP address and port, a source service type (e.g., an identifier of the service hosting the source), an identity (e.g., a role or certificate identity of the source). The metadata can include traffic flow destination attributes, such as a destination IP address, destination port, destination service type, destination identity (e.g., a role or certificate identity).

The metadata can also include identifiers of traffic flow path components. Based on the current configuration, a path may be made of one or more network and/or application delivery components. Based on the path components, the current connectivity can be discovered that enables the traffic flow. Path components can be, for example, firewall rules, access control lists, route tables, cloud routers, network peering components, privatelink endpoints, resource link endpoint components, CVN lattices, load balancers, gateways, routers, switches, tunneling components, and the like.

The metadata can also include traffic flow performance attributes, such as a latency profile and/or throughput profile. The latency profile may provide a baseline for the flow latency as experienced by the flow and could include historical data, current data, and/or predictive analysis inference data. The throughput profile may provide a baseline for the flow latency as experienced by the flow, and could include historical data, current data, and/or predictive analysis inference data.

The metadata can also include correlation attributes. Each traffic flow can be identified as part of an access pattern and receive a set of correlation tags that help identify it as part of the communication matrix. These values could include a traffic flow vector direction, a traffic vector association with a graph path (either a new path, or a path that has previously been learned and exists in the graph), and/or a timeline dependency correlation identifying if the flow is somehow dependent or associated with another traffic flow.

In some examples, additional data related to components (e.g., such as capabilities, limits, and quotas) can also be used to enrich traffic flow metadata. With a full view of a traffic flow, from the source to the destination, path data can be enriched with service quotas and limits, and the capabilities of each of the network component.

Optionally, at block 608, an updated view of the application can be published, such that an updated view of the performance of the application can be presented to an associated user.

At block 612, operations 600 include performing a network optimization analysis to identify if a reconfiguration may improve the current or future functioning of the application in terms of its networking configuration. Block 612 may occur after block 606, according to a schedule, or upon block 610, when some other triggering event may occur (such as receipt of a request originated by a user to perform such an analysis, or upon detection of a performance issue associated with an application (e.g., an alarm indicating a high value of traffic, or slow system performance, or the like).

After the analysis at block 612, operations 600 include block 614 where a recommended change can be displayed or presented to a user, who may implement the change on their own or may submit a request to have the changes made on their behalf. Alternatively, or additionally, operations 600 include block 616 and the recommended changes can be automatically made, such as by interacting with various services of the cloud provider network to change the configuration. For example, other networking components can be launched or provisioned, components can be updated to route traffic flows differently, capabilities of existing network components can be modified, or the like.

Figure 7:
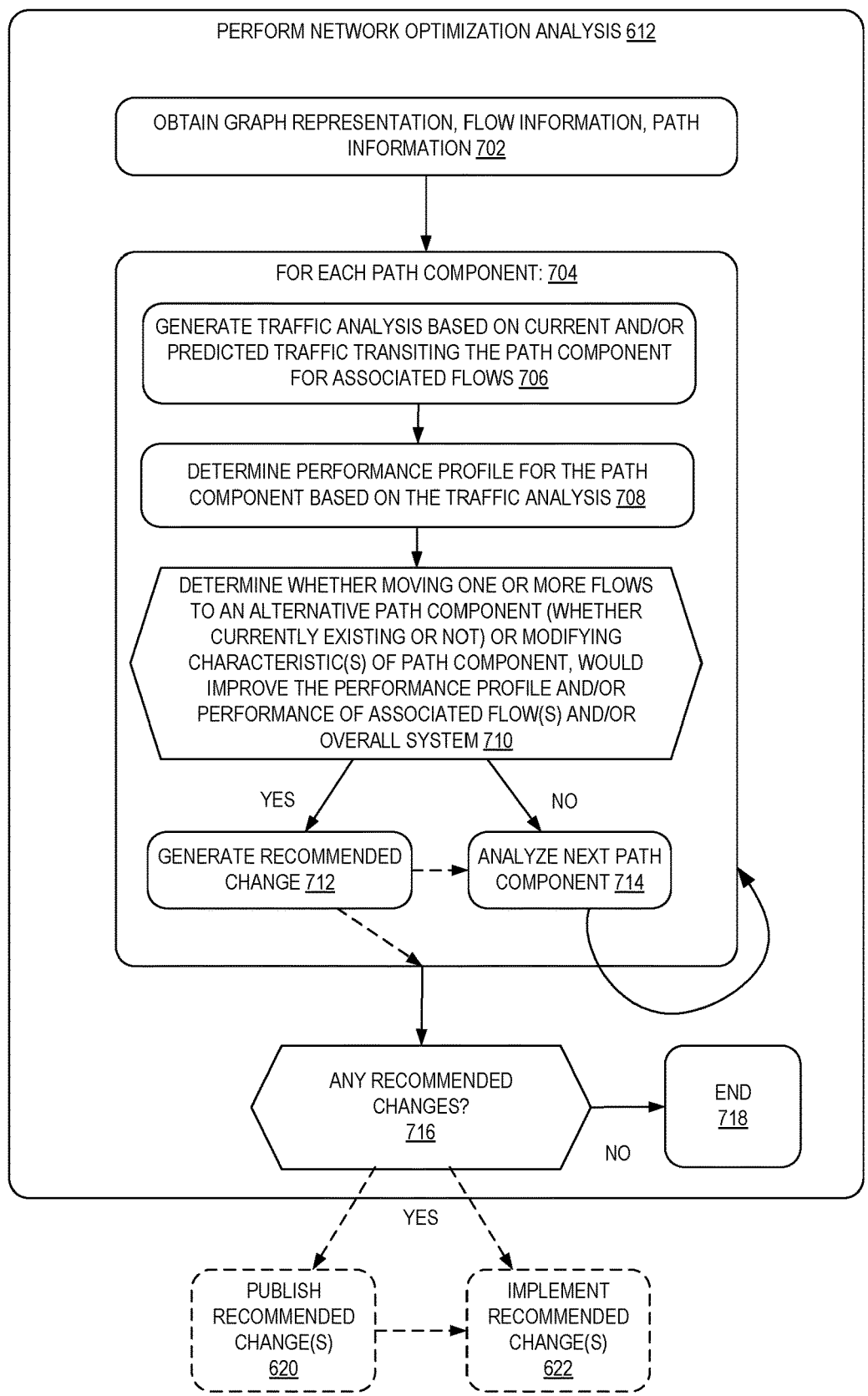
FIG. 7 is a flow diagram illustrating operations of a method for performing network optimization analysis according to some examples.

For further detail on the analysis of block 612, FIG. 7 is a flow diagram illustrating operations 700 of a method for performing network optimization analysis according to some examples. Some or all of the operations 700 are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the MCNS 110 of the other figures.

In some examples, block 612 includes block 702, and obtaining the graph representation (e.g., data structure) and associated flow and path information, which may or may not be stored as separate data structures. This obtaining may include accessing these data structures from a storage, such as a local or remote persistent storage location.

With this data, at block 704 an analysis can be performed with each path component. In some examples, at block 706, a traffic analysis is generated based on current and/or predicted traffic transiting the path component for any associated flows. This can include generating a total amount of traffic (in terms of one or more dimensions such as bandwidth, requests per unit time, or the like) that transits the network component, or is expected to transit the network component at a future point in time (e.g., within the next few minutes or hours). At block 708, a performance profile is determined for the path component based on the traffic analysis, which can include determining, for one or more dimensions, whether the capability of the network component is fully consumed, or what percentage of the capability of the network component is consumed. In some examples, a performance rating is assigned to the network component, such as "operational" when the capability of the network component in some number of dimensions is below a threshold (e.g., is less than 80% utilized), or "degraded" when the capability of the network component in some number of dimensions is above that threshold but less than another threshold (e.g., between 80-95%), or "impaired" when the when the capability of the network component in some number of dimensions is above another threshold (e.g., greater than 95%). Of course, other techniques can be utilized with or without these categories, there may be more or fewer categories at different thresholds, or the like.

At decision block 710, the operations include determining whether moving one or more flows to an alternative path component (whether currently existing or not) or modifying characteristic(s) of the path component, would improve the performance profile and/or performance of associated flow (s) and/or overall system. For example, this determination may fail if the network component is already in a "good" performance profile status (e.g., "operational"), even though moving flows from the component would reduce its load.

However, a flow could still be moved even if the network component is already in a "good" performance profile status (e.g., "operational") due to the performance of the flow itself being substantially improved—e.g., by moving a flow to another network component that provides superior performance, perhaps via providing additional throughput, request handling, less latency, or the like.

Additionally, or alternatively, if the network component is in a sub-par performance profile status (e.g., degraded or impaired), the analysis may include identifying one, multiple, or all flows to be moved off the network component, and/or a capability of the network component being modified (e.g., a "limit" placed on the network component modified or removed). In some cases, it may be most beneficial to move a "large" flow (in terms of throughput, requests, or the like) to another network component while keeping other flows in place, though in other implementations it may be more desirable to move all flows at once. Beneficially, the decision to move, or not move, flows can be made based on a wide variety of factors available to the implementor, thus providing a flexible solution that can be controlled by the implementor or potentially by the affected users (e.g., in that users could provide some sort of logic identifying how or when to move flows, what considerations are most important (e.g., performance, cost, or the like)).

If a change is determined to be helpful, at block 712 the recommended change can be generated (e.g., added to a list) and then optionally the next path component can be analyzed at block 714. Alternatively, if no change is determined to be helpful, the flow can continue straight to block 714. In some examples, further analysis can be made based on the assumption that other changes are made; however, in some cases when a change is detected, the change may be affected and then the process (e.g., operations 600) may start again once updated metadata can be collected that reflects the result of the change being made.

If no recommended changes are identified at block 716, the flow may continue to block 718 and the process may end until a subsequent invocation. However, if changes are identified, the process may include publishing the recommended changes at block 620 (e.g., via an email, notification, update within a console or dashboard, or the like), and optionally the user may make changes themselves or submit a request to have the changes made on their behalf. Alternatively, such as when a user has opted-in to automatic network adaptation, the recommended changes can be made automatically, providing a rapid response to existing network issues and/or providing fixes prior to issues arising (such as through detecting future issues using the predictive metadata described herein).

Accordingly, examples disclosed herein can learn the behavior of flows and accommodate their changes over time—e.g., the peaks, lows, seasonality (when it starts, ends, recurrences, etc.). Additionally, examples can determine optimal network connectivity options for a flow based on the learned behavior, metadata of existing path components, and the flow attributes such as its protocol, encryption status, etc. Moreover, examples can apply the optimal connectivity options the flow requires, by modifying routing through the path components, creating new path components, modifying DNS resolution, etc., depending on the optimal path components.

Thus, examples make use of more than just typical measured latency or packet loss to optimize network paths. Instead, examples treat flows as part of a graph that maps to the totality of network flows, learns their behavior, and enriches that with the network components of the path and their capabilities and limits. Examples can then optimize the paths for the flows, by making use of the optimal network components, taking into account their capabilities (e.g., capacity, introduced latency, type of protocols they support, etc.).

Figure 8:
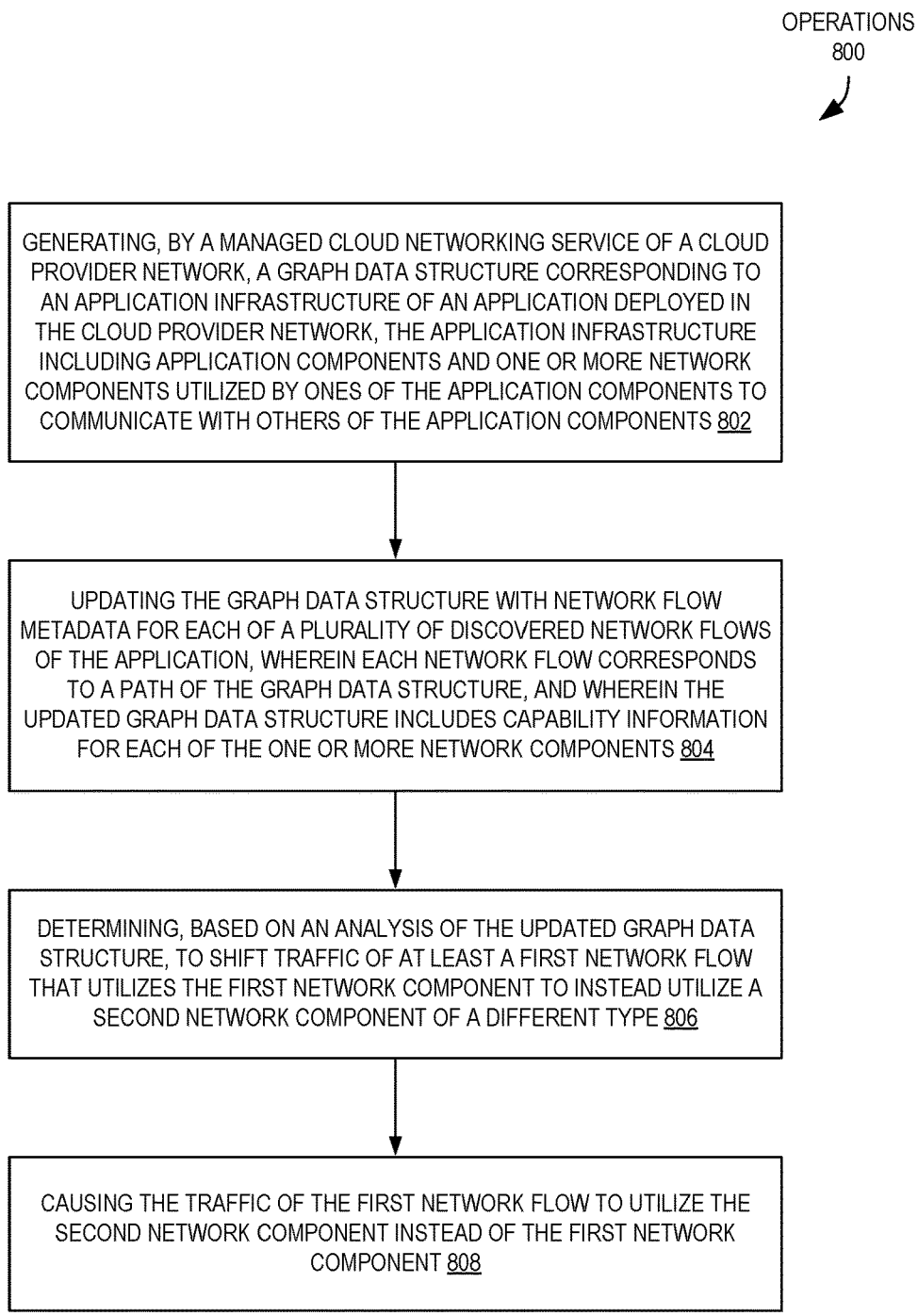
FIG. 8 is a flow diagram illustrating operations of a method for managed adaptive network connectivity in a cloud provider network according to some examples.

FIG. 8 is a flow diagram illustrating operations of a method for managed adaptive network connectivity in a cloud provider network according to some examples. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by the MCNS 110 of the other figures.

The operations 800 include, at block 802, generating, by a managed cloud networking service of a cloud provider network, a graph data structure corresponding to an application infrastructure of an application deployed in the cloud provider network, the application infrastructure including application components and one or more network components utilized by ones of the application components to communicate with others of the application components. In some examples, the graph data structure includes nodes corresponding to the application components and to the one or more network components.

The operations 800 further include, at block 804, updating the graph data structure with network flow metadata for each of a plurality of discovered network flows of the application, wherein each network flow corresponds to a path of the graph data structure, and wherein the updated graph data structure includes capability information for each of the one or more network components.

In some examples, the network flow metadata, for the first network flow, includes source attributes, destination attributes, and one or more flow performance attributes. In some examples, the one or more flow performance attributes include one or more of a latency profile of the network flow or a throughput profile of the network flow, and in some examples, the latency profile or throughput profile includes at least two of: historic flow attributes; current flow attributes; or predictive flow attributes.

In some examples, the network flow metadata, for the first network flow, further includes identifiers of one or more network components on a path of the first network flow, the one or more network components including the first network component. In some examples, the network flow metadata, for the first network flow, further includes capability information for the first network component, the capability information comprising at least one of: a maximum throughput of the first network component; a maximum supported request processing rate of the first network component; or an added latency amount introduced by the first network component.

The operations 800 further include, at block 806, determining, based on an analysis of the updated graph data structure, to shift traffic of at least a first network flow that utilizes the first network component to instead utilize a second network component of a different type.

In some examples, the analysis of the updated graph data structure includes identifying the first network component as currently handling more than a threshold amount of requests or throughput relative to its corresponding maximum supported request processing rate or maximum throughput.

In some examples, the analysis of the updated graph data structure includes determining that the first network component is predicted to handle more than a threshold amount of requests or throughput relative to its corresponding maximum supported request processing rate or maximum throughput.

The operations 800 further include, at block 806, causing the traffic of the first network flow to utilize the second network component instead of the first network component.

In some examples, upon causing the traffic of the first network flow to utilize the second network component instead of the first network component, the first network component remains being utilized for one or more other additional network flows of the plurality of network flows.

In some examples, causing the traffic of the first network flow to utilize the second network component instead of the first network component comprises at least one of: transmitting a command to create or deploy an instance of the second network component; configuring one or more routing tables; or modifying a domain name service (DNS) resolution associated with a hostname.

In some examples, the operations further include transmitting a recommendation to shift the traffic of the first network flow from the first network component to the second network component; and receiving a request indicating that the traffic of the first network flow is to be shifted from the first network component to the second network component. In some examples, the transmission causes display, via a graphical user interface (GUI), of the recommendation to shift the traffic of the first network flow from the first network component to the second network component. In some examples, via use of the GUI, a user can provide user input that causes the request (indicating that the traffic of the first network flow is to be shifted from the first network component to the second network component) to be transmitted, such as from a user computing device to the managed cloud networking service.

Figure 9:
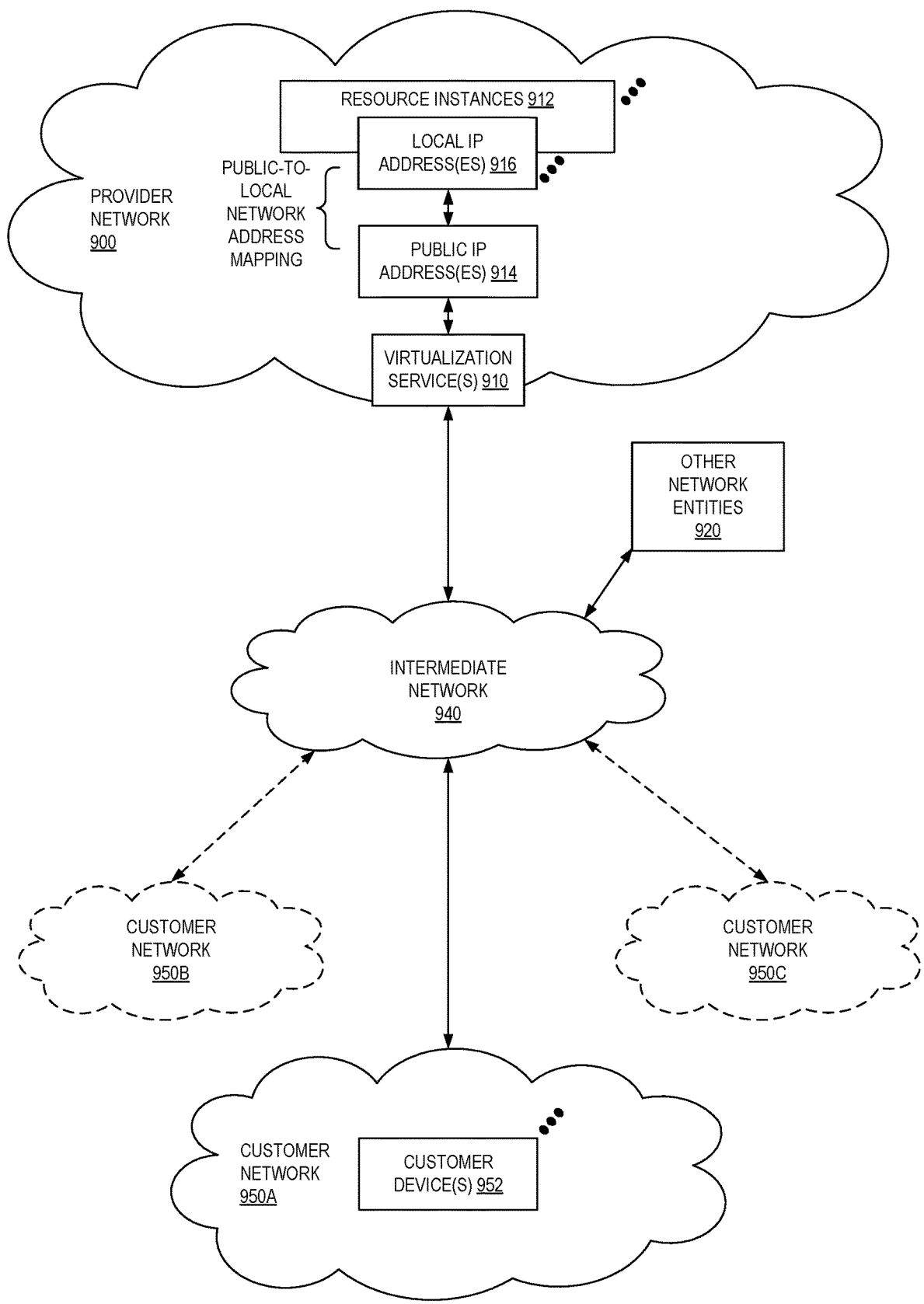
FIG. 9 illustrates an example provider network environment according to some examples.

FIG. 9 illustrates an example provider network (or "service provider system") environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
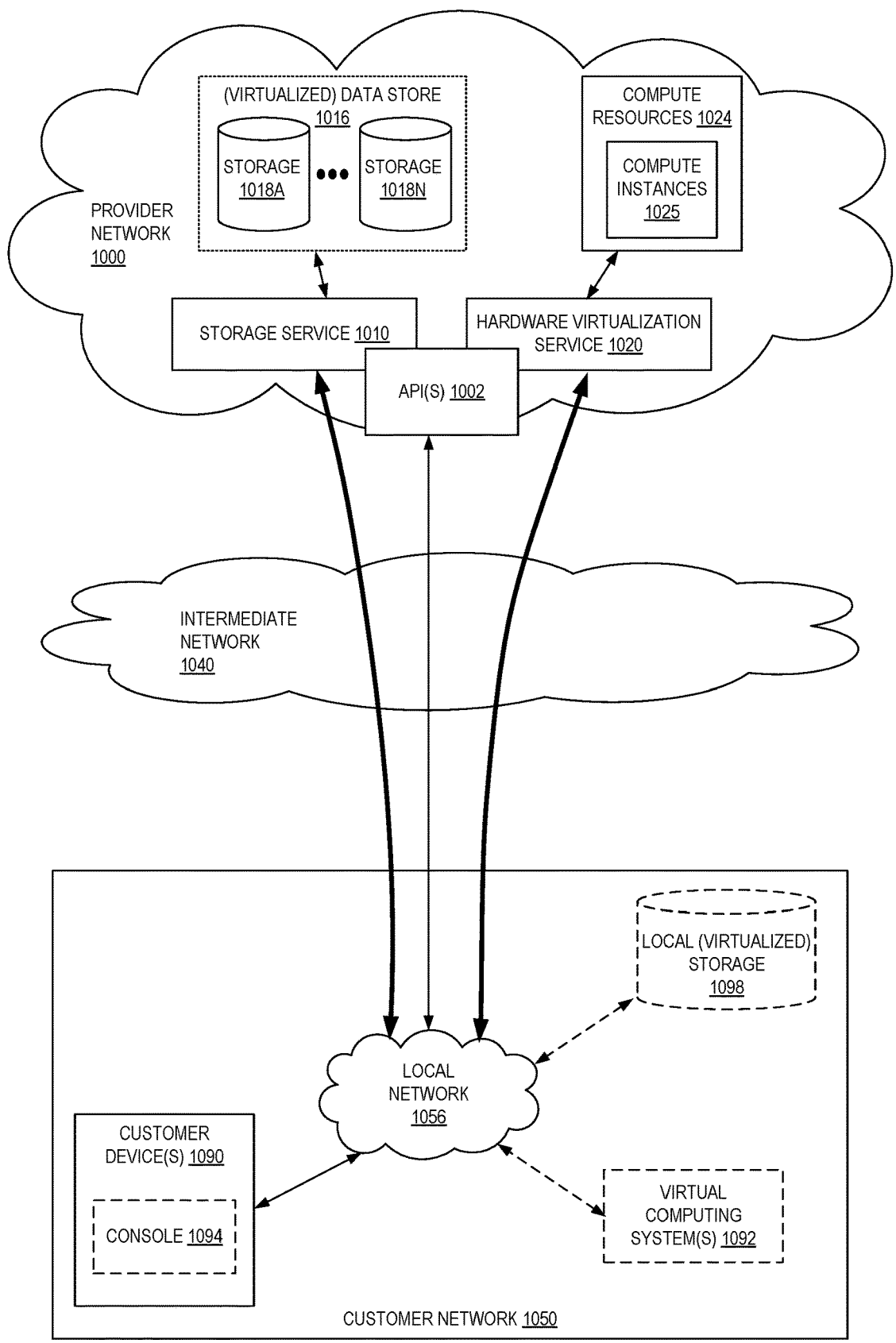
FIG. 10 is a block diagram of an example provider network that provides a storage service and a hardware virtualization service to customers according to some examples.

FIG. 10 is a block diagram of an example provider network environment that provides a storage service and a hardware virtualization service to customers, according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Illustrative Systems

Figure 11:
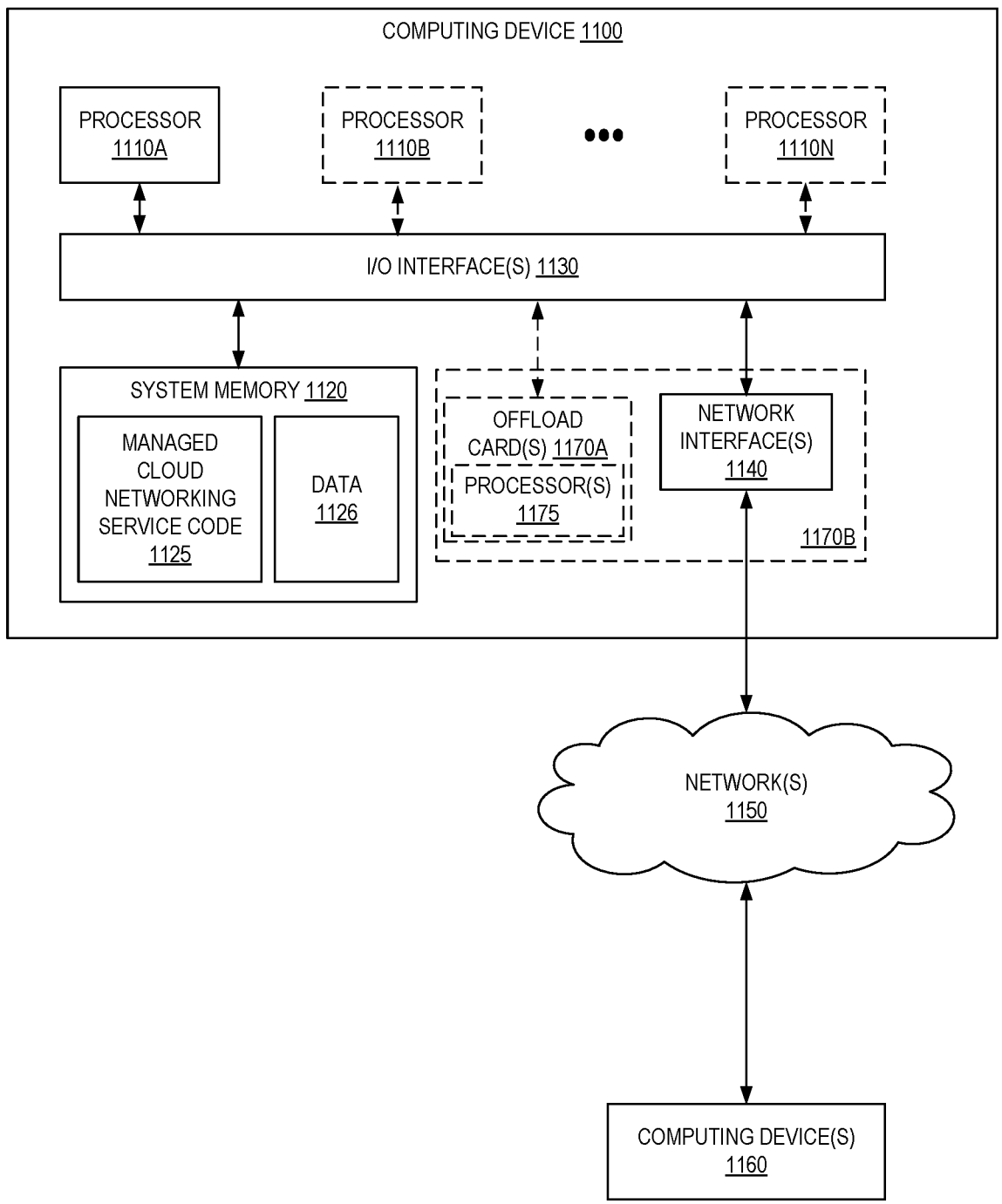
FIG. 11 is a block diagram illustrating an example computing device that can be used in some examples.

In some examples, a system that implements a portion or all of the techniques described herein can include a general-purpose computer system, such as the computing device 1100 (also referred to as an electronic device or computer system) illustrated in FIG. 11, that includes, or is configured to access, one or more computer-accessible media. In the illustrated example, the computing device 1100 includes one or more processors 1110 coupled to a system memory 1120 via an input/output (I/O) interface 1130. The computing device 1100 further includes a network interface 1140 coupled to the I/O interface 1130. While FIG. 11 shows the computing device 1100 as a single computing device, in various examples the computing device 1100 can include one computing device or any number of computing devices configured to work together as a single computing device 1100.

In various examples, the computing device 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as managed cloud networking service code 1125 (e.g., executable to implement, in whole or in part, the managed cloud networking service 110) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computing device 1100 and other computing devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect—Express (PCI-E) standard, or another interconnect such as a QuickPath interconnect (QPI) or UltraPath interconnect (UPI)). For example, in some examples the computing device 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computing device 1100. However, in some examples the virtualization manager implemented by the offload card(s) 1170A or 1170B can accommodate requests from other entities (e.g., from compute instances themselves), and cannot coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, by a managed cloud networking service of a cloud provider network, a request originated on behalf of a user to enable automated adaptive network connectivity for an application deployed within the cloud provider network;

obtaining, by the managed cloud networking service from one or more other services in the cloud provider network, data identifying application components and one or more network components utilized by ones of the application components to communicate with others of the application components;

generating, by the managed cloud networking service based on the data, a graph data structure corresponding to an application infrastructure of the application, wherein the graph data structure includes nodes corresponding to the application components and to the one or more network components;

updating the graph data structure with network flow metadata for each of a plurality of discovered network flows of the application, wherein each network flow corresponds to a path of the graph data structure, and wherein the updated graph data structure includes capability information for each of the one or more network components;

determining, based on an analysis of the updated graph data structure, to shift traffic of at least a first network flow that utilizes the first network component to instead utilize a second network component of a different type; and transmitting a recommendation to shift the traffic of the first network flow from the first network component to the second network component, wherein the transmission causes display, via a graphical user interface (GUI), of the recommendation.

2. The computer-implemented method of claim 1, further comprising:
receiving a request indicating that the traffic of the first network flow is to be shifted from the first network component to the second network component; and
causing the traffic of the first network flow to utilize the second network component instead of the first network component.

3. The computer-implemented method of claim 1, wherein the network flow metadata, for the first network flow, includes:
source attributes;
destination attributes;
one or more flow performance attributes; and
identifiers of one or more network components on a path of the first network flow, the one or more network components including the first network component.

4. A computer-implemented method comprising:
generating, by a managed cloud networking service of a cloud provider network, a graph data structure corresponding to an application infrastructure of an application deployed in the cloud provider network, the application infrastructure including application components and one or more network components utilized by ones of the application components to communicate with others of the application components;
updating the graph data structure with network flow metadata for each of a plurality of discovered network flows of the application, wherein each network flow corresponds to a path of the graph data structure, and wherein the updated graph data structure includes capability information for each of the one or more network components;
determining, based on an analysis of the updated graph data structure, to shift traffic of at least a first network flow that utilizes the first network component to instead utilize a second network component of a different type; and
causing the traffic of the first network flow to utilize the second network component instead of the first network component.

5. The computer-implemented method of claim 4, wherein the graph data structure includes nodes corresponding to the application components and to the one or more network components.

6. The computer-implemented method of claim 4, wherein the network flow metadata, for the first network flow, includes source attributes, destination attributes, and one or more flow performance attributes.

7. The computer-implemented method of claim 6, wherein the one or more flow performance attributes include one or more of a latency profile of the network flow or a throughput profile of the network flow.

8. The computer-implemented method of claim 7, wherein the latency profile or throughput profile includes at least two of:
historic flow attributes;
current flow attributes; or
predictive flow attributes.

9. The computer-implemented method of claim 6, wherein the network flow metadata, for the first network flow, further includes identifiers of one or more network components on a path of the first network flow, the one or more network components including the first network component.

10. The computer-implemented method of claim 9, wherein the network flow metadata, for the first network flow, further includes capability information for the first network component, the capability information comprising at least one of:
a maximum throughput of the first network component;
a maximum supported request processing rate of the first network component; or
an added latency amount introduced by the first network component.

11. The computer-implemented method of claim 4, wherein the analysis of the updated graph data structure includes identifying the first network component as currently handling more than a threshold amount of requests or throughput relative to its corresponding maximum supported request processing rate or maximum throughput.

12. The computer-implemented method of claim 4, wherein the analysis of the updated graph data structure includes determining that the first network component is predicted to handle more than a threshold amount of requests or throughput relative to its corresponding maximum supported request processing rate or maximum throughput.

13. The computer-implemented method of claim 4, wherein upon causing the traffic of the first network flow to utilize the second network component instead of the first network component, the first network component remains being utilized for one or more other additional network flows of the plurality of network flows.

14. The computer-implemented method of claim 4, further comprising:
transmitting a recommendation to shift the traffic of the first network flow from the first network component to the second network component; and
receiving a request indicating that the traffic of the first network flow is to be shifted from the first network component to the second network component.

15. The computer-implemented method of claim 4, wherein causing the traffic of the first network flow to utilize the second network component instead of the first network component comprises at least one of:
- transmitting a command to create or deploy an instance of the second network component;
- configuring one or more routing tables; or
- modifying a domain name service (DNS) resolution associated with a hostname.

16. A system comprising:
- a first one or more computing devices to implement one or more services in a multi-tenant cloud provider network, the one or more services to host an application deployed in the cloud provider network, the application having an application infrastructure including application components and one or more network components utilized by ones of the application components to communicate with others of the application components; and
- a second one or more computing devices to implement a managed cloud networking service in the multi-tenant cloud provider network, the managed cloud networking service including instructions that upon execution cause the managed cloud networking service to:
  - generate a graph data structure corresponding to the application infrastructure;
  - update the graph data structure with network flow metadata for each of a plurality of discovered network flows of the application, wherein each network flow corresponds to a path of the graph data structure, and wherein the updated graph data structure includes capability information for each of the one or more network components;
  - determine, based on an analysis of the updated graph data structure, to shift traffic of at least a first network flow that utilizes the first network component to instead utilize a second network component of a different type; and
  - cause, via interaction with the one or more services, the traffic of the first network flow to utilize the second network component instead of the first network component.

17. The system of claim 16, wherein the network flow metadata, for the first network flow, includes source attributes, destination attributes, and one or more flow performance attributes.

18. The system of claim 17, wherein the one or more flow performance attributes include one or more of a latency profile of the network flow or a throughput profile of the network flow.

19. The system of claim 18, wherein the latency profile or throughput profile includes at least two of:
- historic flow attributes;
- current flow attributes; or
- predictive flow attributes.

20. The system of claim 16, wherein:
- the analysis of the updated graph data structure includes identifying the first network component as currently handling more than a threshold amount of requests or throughput relative to its corresponding maximum supported request processing rate or maximum throughput; or
- the analysis of the updated graph data structure includes determining that the first network component is predicted to handle more than a threshold amount of requests or throughput relative to its corresponding maximum supported request processing rate or maximum throughput.

* * * * *